March 23, 1965  O. F. SWANSON ETAL  3,174,684

VOTING MACHINE

Filed Aug. 16, 1962  6 Sheets-Sheet 1

INVENTOR.
OSCAR F. SWANSON
MICHAEL T. MOLDOVAN
BY
Bean, Brooks, Buckley + Bean
ATTORNEYS

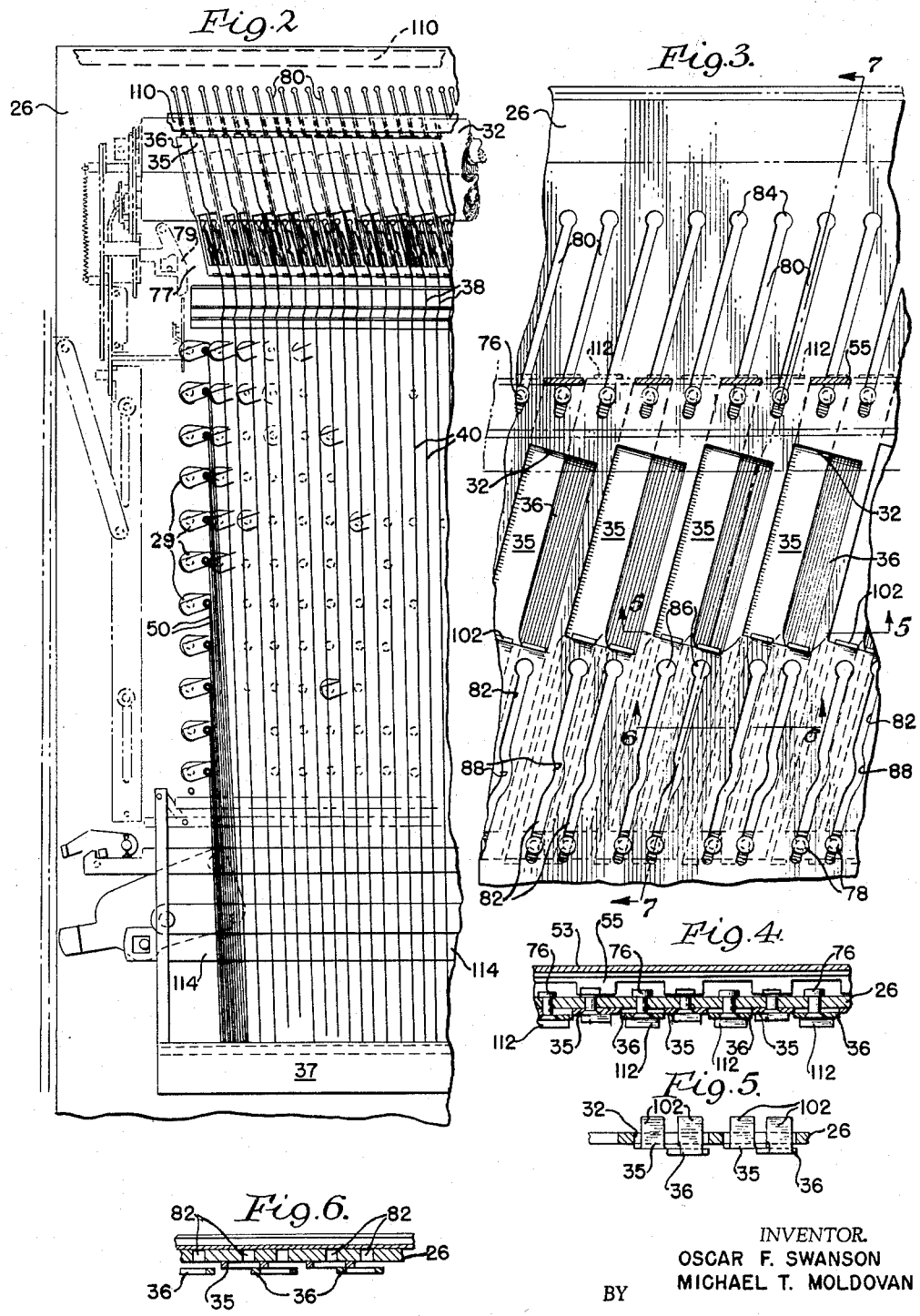

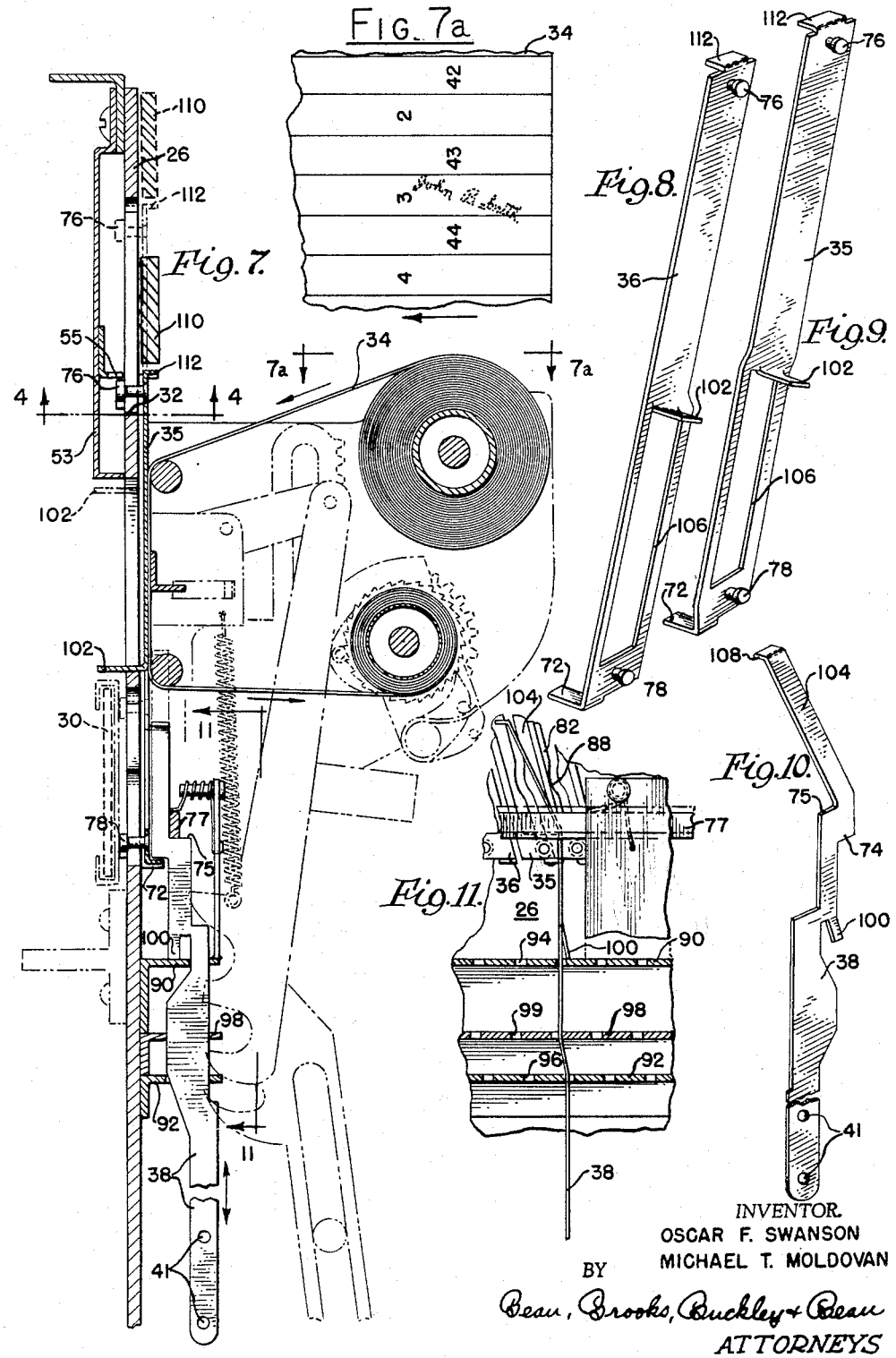

March 23, 1965 O. F. SWANSON ETAL 3,174,684
VOTING MACHINE
Filed Aug. 16, 1962 6 Sheets-Sheet 4

INVENTOR.
OSCAR F. SWANSON
BY MICHAEL T. MOLDOVAN

Bean, Brooks, Buckley + Bean
ATTORNEYS

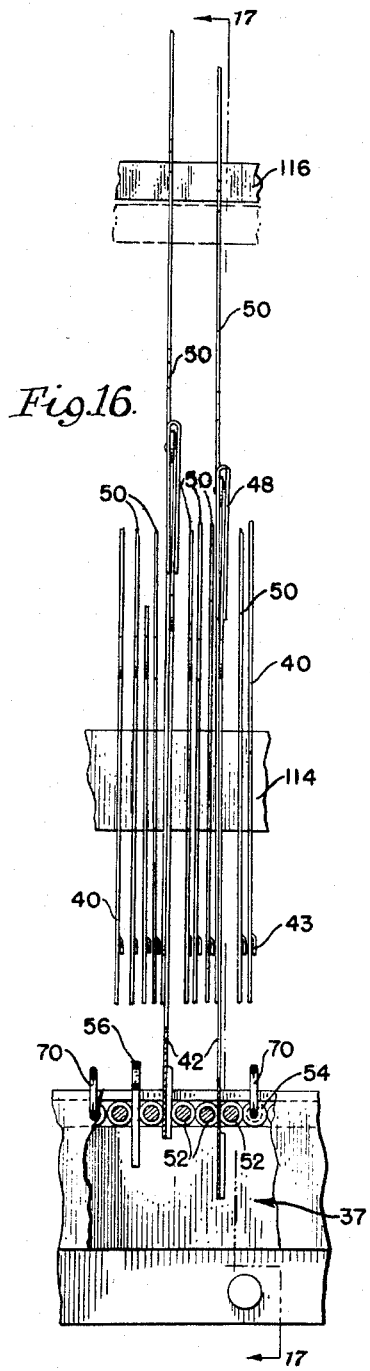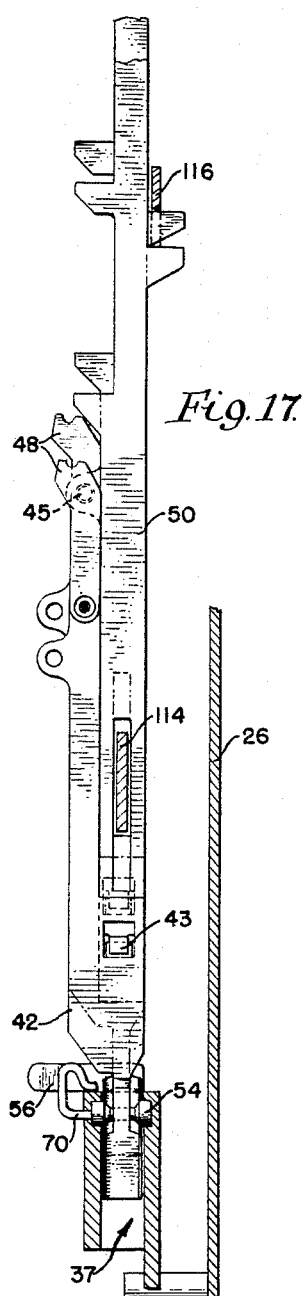

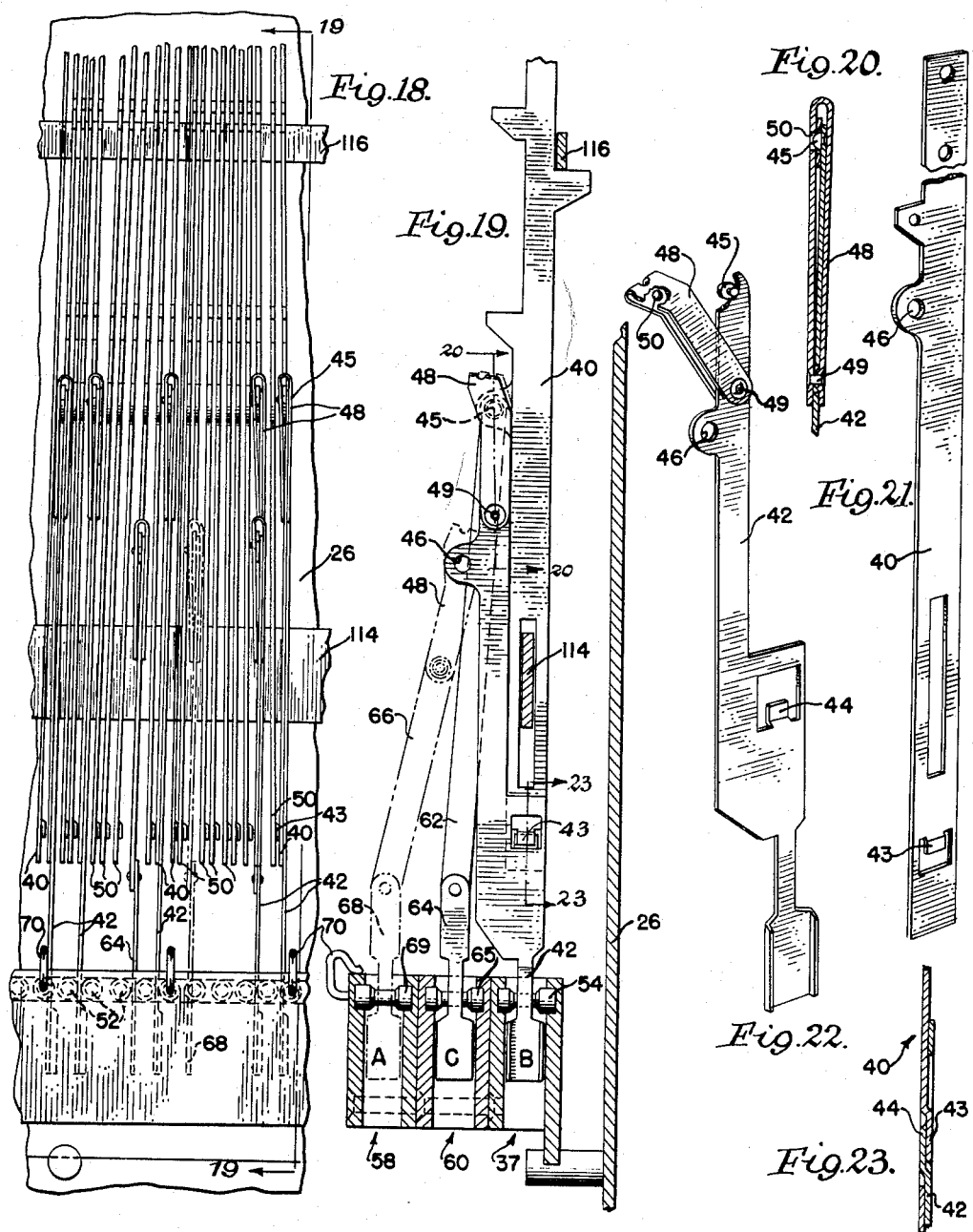

" # 3,174,684
VOTING MACHINE

Oscar F. Swanson and Michael T. Moldovan, Jamestown, N.Y., assignors, by mesne assignments, to Automatic Voting Machine Corporation, Jamestown, N.Y., a corporation of Delaware
Filed Aug. 16, 1962, Ser. No. 217,470
10 Claims. (Cl. 235—54)

This invention relates to voting machines of the type wherein a number of manually actuated voting spindles are provided to enable a voter to cast his votes for his preferred candidates.

Because voters may sometimes wish to vote for candidates to whom no mechanically operated voting spindles are assigned, the machines referred to also typically include some mechanism to enable voters to "write-in" the names of candidates on a paper ballot. Such mechanisms are usually operably tied in with the main interlock mechanism, so that when a voter elects to cast a vote by writing the name of a candidate on the paper ballot, he cannot also operate the mechanical voting spindle assigned to another candidate running for the same office. Hence, whenever a write-in vote was cast, all of the pull straps in that particular section of the interlock were immobilized, and consequently all the voting spindles connected to said straps were locked. While this arrangement gave the machines some degree of flexibility, it also limited the voting capacity of the machine.

When there were relatively few candidates or offices to be filled, or questions to be voted on, the above mentioned limitation of the voting capacity of the machine presented no serious problem. But, because of the increase in the number of offices for which candidates are now to be elected, and the increase in the number of candidates who run independently of any major political party, and the increase in the number of questions to be voted on, the machine arrangements above referred to are no longer adequate. Nor is it feasible to provide facilities to accommodate further increased numbers of candidates, or questions which can be voted on by simply increasing the number of voting spindles or voting columns, because the voting machines are already about as large and as heavy as practicable, and because it is necessary that the average voter be able to conveniently reach all voting keys on the face of the machine. Since requirements vary in different voting districts, and since requirements may also vary from time to time in the same district, it is impracticable to provide a standard machine equipped with all of the parts required to adapt it to all conceivable requirements.

It is a prime object of my present invention to provide an improved machine of the type aforesaid whereby the number of candidates, or questions, which can be voted on may be substantially increased without increasing the number of voting spindles and voting columns, and without substantial increase to the interlock mechanism and the overall dimensions or the cost of the machine.

A further object of the invention is to provide a machine of increased versatility which is more readily adaptable to the requirements of various districts and to the laws of various states.

More specifically, another object is to provide in a machine as aforesaid means doubling the machine write-in capacity while employing only one write-in ballot sheet.

A still further object of the invention is to provide an improved standard type machine which may be completely assembled for normal use under standard conditions, but which can be readily adapted "on the job" to any increased requirements of a particular voting district merely by the addition of a few parts and with slight adjustments of other parts.

Other objects of my invention will be apparent from the following specification and the accompanying drawings wherein:

FIG. 2 is a fragmentary rear elevational view of the machine, on enlarged scale;

FIG. 3 is an enlarged scale fragmentary view of a portion of FIG. 1, with a cover plate removed, showing details of the write-in operating mechanism as shown in the upper part of FIG. 1;

FIG. 4 is a fragmentary section taken on line 4—4 of FIG. 7.

FIG. 5 is a fragmentary section taken on line 5—5 on FIG. 3;

FIG. 6 is a fragmentary section taken on line 6—6 of FIG. 3;

FIG. 7 is a fragmentary sectional view taken on line 7—7 of FIG. 3;

FIG. 7a is a fragmentary elevational view taken on line 7a—7a of FIG. 7;

FIG. 8 is a perspective view of one of a pair of write-in ballot shutters, as shown in FIG. 1;

FIG. 9 is a perspective view of the other shutter of the same pair;

FIG. 10 is a perspective view of the upper portion of a strap assembly which is actuated by movement of the connected write-in ballot shutter;

FIG. 11 is an enlarged scale fragmentary view showing the strap of FIG. 10 in normal or non-voted position;

Figure 12:
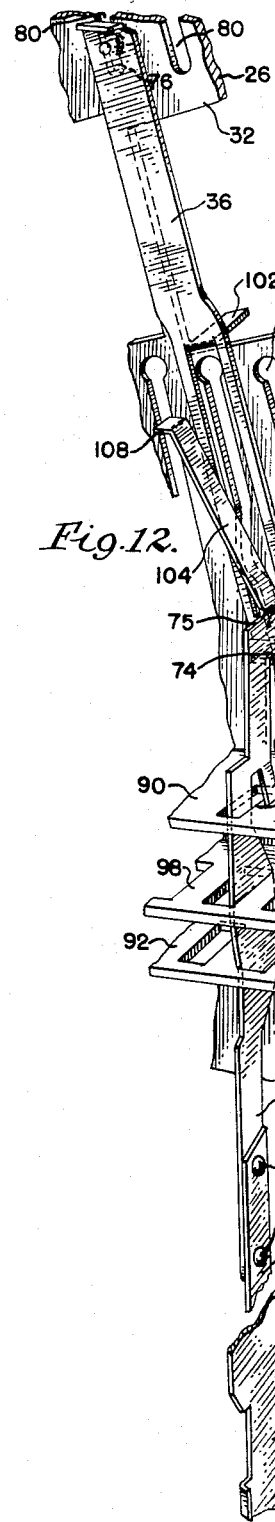
FIG. 12 is an enlarged scale fragmentary perspective view of the write-in shutter of FIG. 9 engaged with the corresponding write-in interlock strap assembly when in normal or non-voted position.
Figure 13:
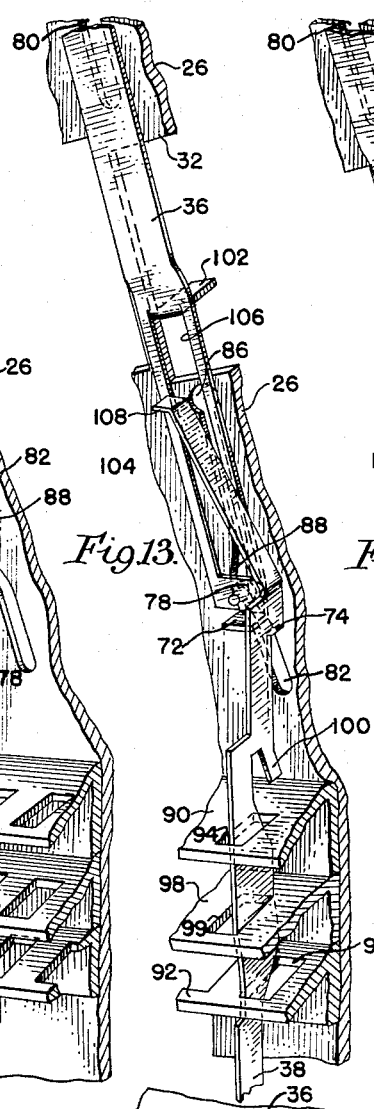
Figure 14:
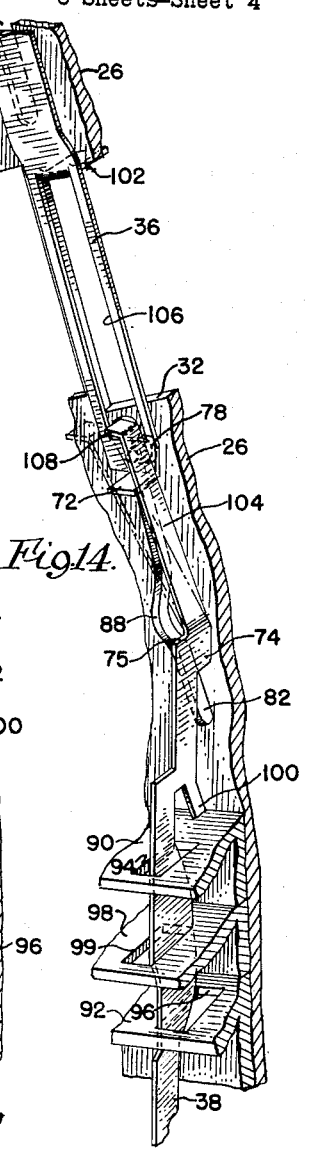
Figure 15:
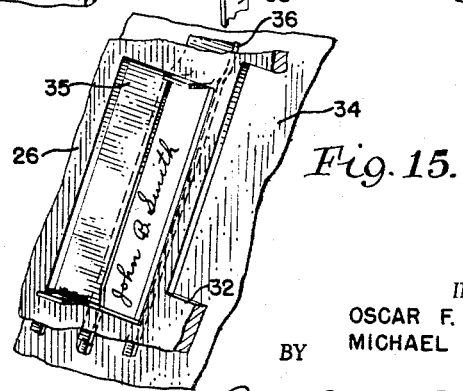

FIG. 13 corresponds to FIG. 12 but shows the shutter mechanism intermediately of its movement towards "voting" position and the interlock strap assembly at its peak of vertical displacement;

FIG. 14 corresponds to FIGS. 12–13 but shows the write-in shutter at full exposure position and spring-biased to maintain it there pending completion of the voting cycle;

FIG. 15 is a fragmentary front perspective view of a pair of write-in shutters, with one shutter in open position and showing a "write-in" vote;

FIG. 16 is an enlarged scale fragmentary view of a typical single interlock strap column, as shown generally at the lower left hand corner of FIG. 2;

FIG. 17 is a section taken on line 17—17 of FIG. 16;

FIG. 18 corresponds to FIG. 16 but shows a multiple interlock column arrangement;

FIG. 19 is a section taken on line 19—19 of FIG. 18;

FIG. 20 is an enlarged scale sectional view taken on line 20—20 of FIG. 19;

FIG. 21 is a fragmentary perspective view of the lower interlock strap member as indicated in FIG. 12;

FIG. 22 is a similar view of an interlock wedge optionally used in conjunction with the lower interlock strap of FIGS. 12, 16, 17, 18, 19; and FIG. 23 is a section taken on line 23—23 of FIG. 19.

Figure 1:
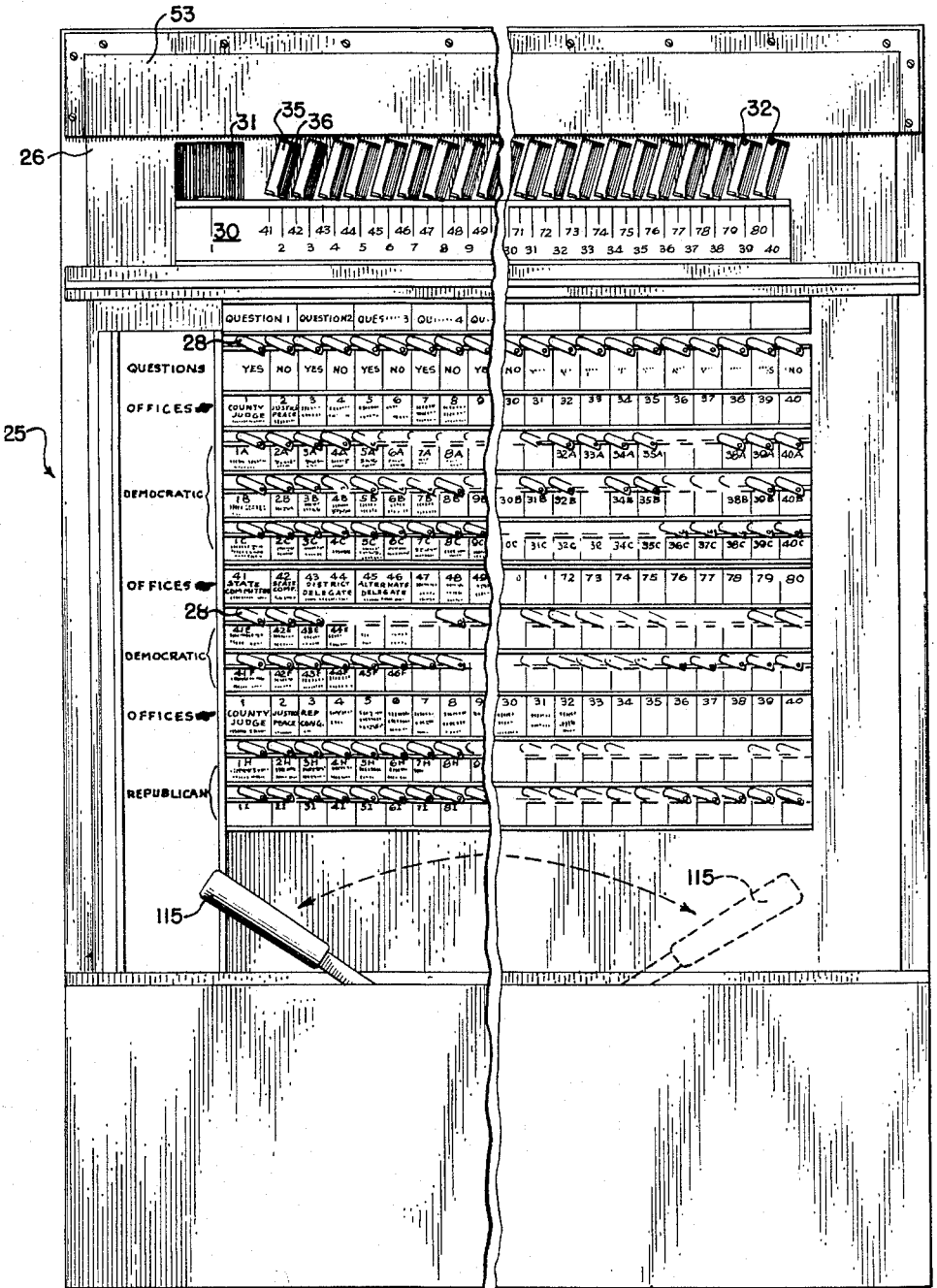
FIG. 1 is a fragmentary front elevational view of a voting machine embodying my invention.

Generally stated, the invention contemplates an improved voting machine arrangement whereby two write-in votes may be cast in connection with any one vertical column of candidates without additional interlock arrangements; thereby doubling the write-in capacity of a given machine while still requiring use of only one write-in ballot sheet. For example, if circumstances require it a standard 40 candidate column machine with 9 party rows can be easily converted to an 80 candidate column machine with 4 party rows each, while still retaining the required write-in facilities. As illustrated herein these features and advantages may be obtained by constructing a voting machine to comprise a machine case as indicated generally at 25, (FIG. 1) mounting a front panel 26 (FIGS. 1-7, 11-15, 17-19) which is of flat sheet metal form appropriately apertured to mount various devices including standard type voting spindles having voting levers at their front ends as indicated at 28 (FIG. 1) and rear crank arms 29 (FIG. 2) arranged in vertical columns and horizontal rows as in the earlier patents referred to. As indicated at 30 (FIGS. 1, 7) a conventional identification card is carried by a holder of channel form mounted to extend horizontally across the voting panel just below the line of write-in shutters into which the machine custodian inserts an appropriate card having numbers printed thereon corresponding to numbers carried on the related office caption strips therebelow (FIG. 1). As shown in FIG. 7a the write-in paper ballot is ruled lengthwise into segments corresponding width-wise to the write-in apertures, and the segments are numerically identified in correspondence with the office caption numbers presented below the write-in shutters. By way of illustration, FIG. 7a also indicates how a write-in vote will appear to the vote canvasser when the voter has selected to write-in his choice for the office related for example to shutter No. 3. In primary elections each paper ballot entry will be further identified as to party affiliation by means for example of a conventional marginal punch device, as indicated in FIG. 7.

As shown in FIG. 1, the front panel is apertured as indicated at 31 as is conventional and is of such size as to permit writing-in a plurality of names, such as in connection with an election for President and for his electors. As shown at 32 in FIGS. 1, 2, 3, 5, 7, 12, 13, 14, 15, the panel 26 is also formed with rectangular shaped windows through which a voter may write-in single personal choice names on a "write-in" ballot sheet as indicated at 34 (FIGS. 7, 15). As shown in FIGS. 1, 3, these write-in apertures are disposed above each vertical column of voting levers and are obliquely disposed as shown to render the writing-in operation more convenient to the voter. Whereas, formerly each write-in window was fitted with a single shutter and interlock strap arrangement, in the case of the present invention each window is provided with a pair of shutters as indicated at 35, 36 (FIGS. 1-9, 11-15) the shutters 35 in the drawing herewith being unlined and showing white, while the shutters 36 are lined to show dark, to facilitate shutter identification.

The shutters 36 correspond to the shutters conventionally provided for standard or single write-in purposes, and as shown herein each shutter 36 connects through an interlock strap system to the main interlock channel 37 (FIGS. 2, 16, 17, 19). This strap system includes an upper strap 38 (FIGS. 2, 7, 10-14), to which is riveted a lower strap 40 (FIGS. 2, 12, 16, 18-19, 21, 23) as indicated at 41, and on occasion an interlock wedge strap 42 (FIGS. 12, 16-20, 22, 23) is mounted to suspend from the lower strap 40 by means of a slip joint provided by interfitting tabs 43, 44 (FIGS. 21-23) and by means of a pin and socket detachable connection as indicated at 45, 46 (FIGS. 16-22). The pin 45 is integral with the strap 42 and the socket 46 is formed in the strap 40. The pin and socket connection is secured by means of a retaining yoke 48 (FIGS. 16-22) which is pivotally carried at 49 by the wedge strap 42 and is shaped to pivot over the pin and socket connection. The yoke 48 is formed with a detent 50 which slip-fits over the head of the pin 45 and snaps thereon to retain the yoke in holding position against accidental displacement.

The shutters 35 are similar to the shutters 36 and are arranged to lie alongside thereof, and to be connected to an interlock strap system similar to the system of the companion shutters 36. Thus, as illustrated herein the strap system of each shutter 35 comprises an upper strap such as shown at 38 (FIG. 10) and a lower strap such as shown at 40, which is also adapted to receive on occasion an interlock wedge strap for purposes to be explained hereinafter.

It will of course be appreciated that the machine will also embody conventional interlock straps connected to each voting spindle, as explained for example in Patent No. 2,561,272 and as illustrated herein at 50 (FIGS. 2, 16-18). However in the case of the present invention each strap 50 is formed to detachably suspend from its lower end an interlock wedge strap of the type previously described and illustrated at 42 herein. Thus, for example as shown in FIG. 16 selected of the straps 50 may be fitted with interlock wedges 42 and the interlock rollers 52 and the pin rollers 54 are so arranged as to set up an interlock system which will permit the turning of only one of the voting spindles or opening of only one of the write-in shutters to which the wedge carrying straps are connected. Simply by attaching wedge-carrying straps to the desired interlock straps of the system, any required number of spindles and/or write-in shutters, or combinations thereof, will be left free for voting purposes; it being understood of course that appropriately sized spacers (such as the rollers 52 or compensator wedges as shown at 56) will be employed. For example, as shown in FIG. 16, only one spindle or write-in may be voted in the illustrated interlock group. To permit two selections the compensator wedge 56 is removed.

Thus, it will be seen that by virtue of the hereinabove described write-in shutter and interlock arrangement each interlock group has acquired a new versatility in that each interlock group may now accommodate two write-in vote facilities and may therefor satisfy the requirements for two different office ballots. Also, by reason of this new arrangement each interlock group will now accommodate two write-in vote facilities for a single office ballot when required, which has not heretofore been possible. As previously stated, adjustments for these purposes may be quickly made in the field to suit the machine to changing ballot requirements. A cover plate 53 (FIGS. 1, 4, 7) is provided to enclose the upper slotted portion of the front panel 26, and whenever the machine is to be used with only one set of write-in shutters operable (either items 35 or 36) the cover plate 53 will carry a flange member 55 which is notched as shown in FIG. 4 so as to block every other one of the studs 76 from upward travel, while leaving the intermediate studs and their corresponding shutters free to be lifted. Therefore, it will be understood that this invention permits the placement of a more complex ballot on a reduced size voting machine, thus providing a new and mechanically simplified voting machine of increased capacity and of reduced size and weight, which offers substantially improved facilities for ballot presentation and voting convenience.

To further increase the versatility of the machine one or more auxiliary interlock channels may be selectively employed in association with the main interlock channel 37, and as shown by way of example in FIG. 19 a pair of auxiliary channels 58, 60 may be installed (either as standard equipment or later "on the job") alongside the main interlock channel 37. As shown in FIG. 19 this arrangement will permit the attachment to spindle and shutter straps of a variety of detachable auxiliary interlock wedge straps. For example an auxiliary strap 62 may be connected as indicated at 46 to any of the shutter or spindle interlock straps in lieu of suspending therefrom main interlock wedge straps 42. Straps 62 pivotally carry wedges 64 disposed between interlock rollers 65 to provide another interlock facility. This permits the spindle and shutter straps to be selectively controlled by the multiple interlock channel system. By virtue of this, the machine may be arranged for example so that the main interlock channel will accommodate a sequence of single group offices by means of wedges 42, while the auxiliary channel will accommodate a large group office by means of wedges 64, or vice versa. This is now feasible because the system now includes the requisite write-in facilities.

If the ballot requires it, additional auxiliary interlock channels such as shown at 58 (FIG. 19) may be added and operably associated with selected spindle and shutter straps through means of auxiliary wedge straps 66, wedges 68, and interlock rollers 69. As shown in FIGS. 18, 19, the main and auxiliary interlock channels are apertured at intervals to accommodate slip-fitting "grouping" pins 70 to demarcate the individual group interlock systems.

Another feature of the machine of the invention resides in the mechanism for interconnecting the write-in shutters and their interlock wedge straps. As shown in better detail in FIGS. 8–15 this mechanism in each case includes a pickup tab 72 which extends laterally from the bottom end of the shutter for pickup engagement with a shoulder 74 formed on the corresponding upper strap 38. The shutters are mounted on the front panel plate 26 for obliquely vertical sliding movements thereon by means of relatively spaced shoulder studs 76, 78 which travel within upper and lower slots 80, 82, respectively, formed through the panel 26; the upper ends of the slots being enlarged as shown at 84, 86 to pass the heads of the studs for initial assembly purposes. The upper slots 80 are of straight line form, while the lower slots 82 include curved cam track portions 88 whereby to "throw" the lower ends of the shutters sidewise at a prescribed position of vertical displacement of the shutter.

The upper straps are mounted and guided for vertical displacements by means of spaced apart guide plates 90, 92 which are apertured in vertical alignment as shown at 94, 96 (FIGS. 11–14). A friction brake plate 98 is disposed between the plates 90, 92 and is also apertured at 99 to accommodate the straps, but is positionally placed relative to the plates 90, 92 so as to press laterally against the straps and to resiliently deform them, thus to provide friction brake effects on the straps against uncontrolled displacements thereof. Also, a step abutment 100 is formed on each strap to extend laterally into registry with the guide plate 90 to prevent dropping of the strap system when disengaged from the shutter tab 72.

The parts are so arranged that whenever the voter lifts the shutter by thumb piece 102 from the position shown in FIG. 12 to cast a write-in ballot, the shutter tab 72 bears upwardly against strap shoulder 74 and this initial motion of the write-in shutter lifts the strap system, thereby pulling the associated wedge into position between the interlock rollers in its associated group, and setting up the interlock system. Simultaneously therewith, shoulder 75 of the strap 38 engages a horizontally disposed trip bar 77 (FIGS. 7, 11) to move to actuate a release latch 79 (FIG. 2) to "open" a conventional mechanism for advancing the write-in ballot sheet 34. Further, upward motion of the shutter as to the position shown in FIG. 13 thereupon causes the stud 78 to travel through the cam portion 88 thereby throwing the tab portion 72 laterally out of engagement with the strap shoulder 74, and disconnecting the strap from the shutter. The shutter may now be further lifted to its fully open position for writing-in purposes. As shown in FIG. 10 the upper portion of the strap 38 is formed with an obliquely bent section 104 against which the tab 72 of the shutter rides after it is freed from the shoulder 74. The parts are so arranged that the section 104 applies a spring-pressed friction force to the shutter tab, whereby when the shutter is elevated so that its aperture 106 is in full registry with the panel aperture 32 it is frictionally held thereat by the spring finger 104 (FIG. 14). The voter may now write his preferred candidate's name upon the write-in paper ballot 34 (FIG. 15) which is exposed through the shutter opening, with utmost ease and facility. The upper end of the strap 38 is formed with an overhang flange 108 in line with tab 72, which is a safety device to prevent uncontrolled dropping of the strap system from the position shown in FIG. 14.

The machine includes an upper "return bar" 110 (FIGS. 2, 7) which is conventional, and which is automatically displaced upwardly when the voter enters the machine, and downwardly when he leaves the machine. The shutters include flanges 112 against which the upper return bar 110 bears when the voter leaves the machine to press the shutters down to restore them to closed positions. Also the machine includes the conventional strap restoring or "return" bar as shown at 114 (FIGS. 2, 16–19) which passes through apertures in the lower interlock straps.

When a voter first enters the machine the main operating lever 115 (FIG. 1) stands at the left hand side of the voting unit. He moves this handle to the right to cause the secrecy curtain to close and this simultaneously sets up the machine for voting, both "return" bars being thereby shifted to their uppermost positions whereby the voting spindle interlock straps and the write-in shutters and their interlock straps are all freed for vertical displacements. The voter then makes his voting selections by turning down the apppropriate voting pointers 28 and/or by opening appropriate shutters and writing in his preferred selections under control of the interlock systems as explained hereinabove. Any such voting action causes the interlock strap system to shift the main lever release bar 116, permitting subsequent return of the lever 115. Then, to register his selections and to exit from the machine he pulls the lever 115 towards the left as viewed in FIG. 1. During the initial stage of this lever motion the counter mechanisms are actuated in occordance with the voting spindle selections; the upper return bar 110 then lowers sufficiently to press any opened write-in shutters down and to free them from the friction of the spring fingers 104. Thus, the tabs 72 drop down below the elevations of the strap shoulders 74. Still further progress of the lever 115 towards the left causes the lower "return" bar 114 to move down and to return the voting spindles and interlock and shutter straps to "home" positions. Also, during the last phase of travel of the lever 115 a conventional type linkage system as indicated at FIG. 7 will cause the mechanism to operate for advancing the write-in ballot sheet 34; thereby restoring the machine in preparation for the next voter.

We claim:

1. In a voting machine of the type having a plurality of voting columns, each column including a plurality of voting pointers having corresponding interlock straps connected thereto and into an interlock channel therebelow and at least one write-in shutter adapted to be lifted to expose a paper ballot for writing thereon and having a lift step extending laterally from said shutter, a lift strap in association with said shutter and having its lower end connected into said interlock channel and having an upper spring end portion bent obliquely and terminating in a laterally bent flange portion adapted to overhang said shutter lift step, said lift strap having a horizontal shoulder portion at a position spaced below said bent end portion for abutting engagement with said lift step, generally vertically extending track means mounting said shutter for sliding movements thereon and including an intermediate curved track portion for displacing the lift step portion of said shutter alternately in opposite sidewise directions incidental to generally vertical movements of said shutter, friction brake means operable against said lift strap to prevent gravity-induced motions thereof while permitting manually-induced motions thereof, the parts being so constructed and arranged that the initial upward motion of said shutter causes said lift step to lift upwardly against said strap shoulder to elevate said strap so as to set up said interlock system, while further upward motion of the shutter causes it to shift laterally on its track so as to disengage said lift and strap shoulder portions, thereby leaving said lift strap restrained by said friction brake means in interlock setting position while said shutter is movable further upwardly into paper ballot exposing position whereat said lift strap upper spring end portion bears against said shutter to provide a friction holding device maintaining said shutter in its fully open position against gravity forces.

2. In a voting machine of the type having a plurality of voting columns, each column including a plurality of voting pointers having corresponding interlock straps connected thereto and into an interlock channel therebelow and at least one write-in shutter adapted to be lifted to expose a paper ballot for writing thereon and having a lift step extending laterally from said shutter, a lift strap in association with said shutter and having its lower end connected into said interlock channel and having an upper spring end portion bent obliquely and terminating in a laterally bent flange portion adapted to overhang said shutter lift step, said lift strap having a horizontal shoulder portion at a position spaced below said bent end portion for abutting engagement with said lift step, generally vertically extending track means mounting said shutter for sliding movements thereon and including an intermediate curved portion for displacing the lift step portion of said shutter alternately in opposite sidewise directions incidental to generally vertical movements of said shutter, friction brake means operable against said lift strap to prevent gravity-induced motions thereof while permitting manually-induced motions thereof, the parts being so constructed and arranged that the initial upward motion of said shutter causes said lift step to bear upwardly against said strap shoulder to elevate said strap so as to set up said interlock system while further upward motion of the shutter causes it to shift laterally on its track so as to disengage said lift step and strap shoulder portions thereby leaving said lift strap restrained by said friction brake means in interlock setting position while said shutter is movable further upwardly into paper ballot exposing position whereat said lift strap upper spring end portion bears against said shutter to provide a friction holding device maintaining said shutter in its fully open position, against gravity forces, and whereby when said shutter is forcibly lowered from open position said lift step of said shutter moves downwardly below the elevation of said lift strap shoulder before said lift strap is returned to its lowered position.

3. In a voting machine of the type having a plurality of voting columns, each column including a plurality of voting pointers having corresponding interlock straps connected thereto and into an interlock channel therebelow and at least one write-in shutter adapted to be lifted to expose a paper ballot for writing thereon and having a lift step extending laterally from said shutter, a lift strap in association with said shutter and having its lower end connected into said interlock channel and having an upper spring end portion bent obliquely and terminating in a laterally bent flange portion adapted to overhang said shutter lift step, said lift strap having a horizontal shoulder portion at a position spaced below said bent end portion for abutting engagement with said lift step, generally vertically extending track means mounting said shutter for sliding movements thereon and including an intermediate curved track portion for displacing the lift step portion of said shutter alternately in opposite sidewise directions incidental to generally vertical movements of said shutter, the parts being so constructed and arranged that the initial upward motion of said shutter causes said lift step to lift upwardly against said strap shoulder to elevate said strap so as to set up said interlock system, while further upward motion of the shutter causes it to shift laterally on its track so as to disengage said lift step and strap shoulder portions, thereby leaving said lift strap in interlock setting position while said shutter is movable further upwardly into paper ballot exposing position whereat said lift strap upper spring end portion bears against said shutter to provide a friction holding device maintaining said shutter in its fully open position against gravity forces.

4. In a voting machine of the type having a plurality of voting columns, each column including a plurality of voting pointers having corresponding interlock straps connected thereto and into an interlock channel therebelow and at least one write-in shutter adapted to be lifted to expose a paper ballot for writing thereon and having a lift step extending laterally from said shutter, a lift strap in association with said shutter and having its lower end connected into said interlock channel and having an upper end portion terminating in a laterally bent flange portion adapted to overhang said shutter lift step, said lift strap having a horizontal shoulder portion at a position spaced below said bent end portion for abutting engagement with said lift step, generally vertically extending track means mounting said shutter for sliding movements thereon and including an intermediate curved track portion for displacing the lift step portion of said shutter alternately in opposite sidewise directions incidental to generally vertical movements of said shutter, friction brake means operable against said lift strap to prevent gravity-induced motions thereof while permitting manually-induced motions thereof, the parts being so constructed and arranged that the initial upward motion of said shutter causes said lift step to lift upwardly against said strap shoulder to elevate said strap so as to set up said interlock system, while further upward motion of the shutter causes it to shift laterally on its track so as to disengage said lift step and strap shoulder portions, thereby leaving said lift strap restrained by said friction brake means in interlock setting position while said shutter is movable further upwardly into paper ballot exposing position.

5. An improved voting machine comprising in combination,
  an upper bank of voting columns and a lower bank of voting columns, said columns being associated with different offices and each; designating a plurality of candidates in vertically aligned relation to each said office,
  a voting spindle associated with each said candidate designation,
  a main interlock,
  interlock straps connected to each spindle in one of said banks and engaged with said main interlock to restrict voting to a prescribed number of selections in each column of said one bank of columns,
  an auxiliary interlock,
  interlock straps connected to each spindle in the other of said banks and engaged with said auxiliary interlock to restrict voting to a prescribed number of selections in each column of said other bank of columns,
  a single write-in paper ballot disposed above said columns,
  a pair of shutters disposed above each voting column of said upper bank for normally covering said paper ballot to prevent writing thereon and each shutter being movable for manual exposure of said paper ballot,
  an interlock strap connected to one shutter of each pair of said shutters and engaged with said main interlock channel,
  and an interlock strap connected to the other shutter of each pair and engaged with said auxiliary interlock.

6. An improved voting machine comprising in combination,
  an upper bank of voting spindles arranged in vertical columns and a lower bank of voting spindles arranged in vertical columns in vertical alignment with the spindle columns of said upper bank,
  a main interlock,
  interlock straps connected to each spindle of said upper bank and engaged with said main interlock to restrict voting to a prescribed number of selections in each column of said upper bank,
  an auxiliary interlock,
  interlock straps connected to each spindle of said lower bank and engaged with said auxiliary interlock to restrict voting to a prescribed number of selections in each column of said lower bank, a single write-in paper ballot, a pair of shutters disposed above each column of said upper bank in normally covering relation to said write-in paper ballot and each shutter being movable for manual exposure of said paper ballot, an interlock strap connected to one shutter of each pair of said shutters and engaged with said main interlock, and an interlock strap connected to the other shutter of each pair and engaged with said auxiliary interlock.

7. An improved voting machine comprising, in combination, a plurality of voting spindles arranged in vertical and horizontal rows, a write-in paper ballot disposed above said spindles, a pair of shutters disposed above each vertical row of spindles normally covering said paper ballot to prevent writing thereon and each shutter being movable to uncover an underlying portion of the paper ballot, an interlock strap connected to and depending from each of said spindles and each of said shutters, a pair of interlocks disposed in side-by-side horizontal relation and in spaced position below the lower ends of said straps, a first group of interlock wedges detachably connected to certain of said interlock straps for engaging one of said interlocks and a second group of interlock wedges detachably connected to other of said interlock straps for engaging the other of said interlocks whereby the total number of possible voting selections may be made at least equal to twice the number of vertical rows of spindles.

8. An improved voting machine comprising, in combination.

a plurality of voting spindles arranged in vertical and horizontal rows, a write-in paper ballot disposed above said spindles, a pair of shutters disposed above each vertical row of spindles normally covering said paper ballot to prevent writing thereon and each shutter being movable to uncover an underlying portion of the paper ballot, an interlock strap connected to and depending from each of said spindles and each of said shutters, a first interlock disposed below the lower ends of said interlock straps and being of a length to accommodate connection to any of the interlock straps, a second interlock contiguous to the first interlock and of a length to accommodate connection to any of the interlock straps, first interlock wedges adapted to be detachable connected to any of said interlock straps for engaging said one interlock and second interlock wedges adapted to be detachably connected to any of said interlock straps for engaging said second interlock whereby one shutter of each pair of shutters associated with each vertical row of spindles together with a plurality of associated upper spindles of each vertical row of spindles may be connected to said one interlock while the other shutter of each pair of shutters together with a plurality of associated lower spindles of each vertical row of spindles may be connected to said second interlock.

9. An improved voting machine comprising in combination, an upper bank of voting spindles arranged in vertical columns and a lower bank of voting spindles arranged in vertical columns in vertical alignment with the spindle columns of said upper bank, a main interlock having a length to accommodate for connection to all of said spindles, interlock straps connected to each spindle of said upper bank and engaged with said main interlock to restrict voting to a prescribed number of selections in each column of said upper bank, an auxiliary interlock having a length to accommodate for connection of all of said spindles and disposed in side-by-side relation to said main interlock, interlock straps connected to each spindle of said lower bank and engaged with said auxiliary interlock to restrict voting to a prescribed number of selections in each column of said lower bank, a single write-in paper ballot, a pair of shutters disposed above each column of said upper bank in normally covering relation to said write-in paper ballot and each shutter being movable for manual exposure of said paper ballot, an interlock strap connected to one shutter of each pair of said shutters and engaged with said main interlock, and an interlock strap connected to the other shutter of each pair and engaged with said auxiliary interlock.

10. An improved voting machine comprising, in combination, a plurality of voting spindles arranged in vertical and horizontal rows, a write-in paper ballot disposed above said spindles, a pair of shutters disposed above each vertical row of spindles normally covering said paper ballot to prevent writing thereon and each shutter being movable to uncover an underlying portion of the paper ballot, an interlock strap connected to and depending from each of said spindles and each of said shutters, a plurality of interlocks disposed in side-by-side horizontal relation and in spaced position below the lower ends of said straps, each interlock being of a length to accomodate for connection to all of said interlock straps, a plurality of interlock wedges engaged with each of said interlocks, and means for selectively connecting said interlock straps to said interlock wedges.

References Cited by the Examiner

UNITED STATES PATENTS

| | | | |
|---|---|---|---|
| 820,802 | 5/06 | Lausterer | 235—54 |
| 945,714 | 1/10 | Gillespie | 235—54 |
| 995,424 | 6/11 | Gillespie | 235—54 |
| 2,953,296 | 9/60 | Shoup | 235—55 |

LEO SMILOW, *Primary Examiner.*